United States Patent

[11] 3,560,673

| [72] | Inventors | Max Norman Schweizer<br>110 S. Clinton Ave., Bay Shore, N.Y. 11706;<br>Sam Barmherzig, 1457 E. 86th St., Brooklyn, N.Y. 11236 |
|---|---|---|
| [21] | Appl. No. | 801,577 |
| [22] | Filed | Feb. 24, 1969 |
| [45] | Patented | Feb. 2, 1971 |

[54] ANTI-THEFT IGNITION SYSTEM
5 Claims, 6 Drawing Figs.

[52] U.S. Cl. .................................................. 200/44,
200/163, 200/153, 70/241, 292/201
[51] Int. Cl. ........................................................ H01h 27/00
[50] Field of Search........................................... 200/42, 44,
50.3, 153.14, 163; 70/241, (Inquired); 292/201, (Inquired)

[56] References Cited
UNITED STATES PATENTS

| 1,827,732 | 10/1931 | Conlan............................ | 200/44 |
| 2,203,949 | 6/1940 | Edwards........................ | 200/44X |
| 2,637,789 | 5/1953 | Critchfield et al............ | 200/44 |
| 2,714,138 | 7/1955 | Arnejo........................... | 200/44 |
| 2,796,755 | 6/1957 | Craig............................. | 200/44X |

Primary Examiner—Robert K. Schaefer
Assistant Examiner—H. J. Hohauser
Attorney—Edward H. Loveman ABSTRACT: An antitheft ignition system which includes a simple, tamper-proof, switch assembly connected in series in a conventional ignition system comprised of a battery, ignition key operator switch, and starter. The switch assembly includes a housing within which is a key operated rotatable contact carrier which carries a set of movable contacts which engage or disengage a pair of stationary contacts carried on the interior of the housing depending on the position of the contact carrier. Thus, the operator must have both the automobile ignition key and a switch assembly operating key in order to start the vehicle. In addition, the switch assembly also carries an actuating member for permitting the trunk or hood to be opened, which actuating member can only be operated when the switch assembly key is inserted in the switch to rotate the contact carrier from a "break" to a "make" position.

INVENTORS
MAX NORMAN SCHWEIZER
SAM BARMHERZIG

BY  Edward M Loveman

ATTORNEY

INVENTORS
MAX NORMAN SCHWEIZER
SAM BARMHERZIG

BY Edward H. Loveman
ATTORNEY

ANTI-THEFT IGNITION SYSTEM

This invention relates to switch assemblies, and more particularly relates to a novel, tamper-proof, switch assembly which functions as the major component of antitheft ignition systems for automobiles and other vehicles.

During recent years, there has been a rapidly increasing number of automobile thefts which has caused great alarm in this country and indeed throughout the world. Beside the obvious ease of stealing a car when the owner has been foolish enough to leave his ignition key in the car, it is a relatively simple matter for unauthorized persons to "jump" ignition wires so as to connect the battery to the electric starter of the vehicle.

With these problems in mind, automobile manufactures have been experimenting with various techniques for preventing unauthorized tampering with the ignition system of an automobile, but at the present time they have been unable to construct a "theftproof" ignition system which is operational, but at the same time simple enough to be economically justifiable.

In contradistinction, the instant invention is directed to an antitheft ignition system and to a switch assembly which is the major component thereof, which is tamper-proof and reliable, but at the same time which is so simple, that its cost is not prohibitive. Thus, in its preferred embodiment, the antitheft ignition system of the instant invention comprises a completely enclosed switch assembly which is inserted in series with a conventional ignition system comprised of a battery, a standard ignition key operator switch, and the electric starter of the vehicle. Since the circuit making and circuit breaking components of the switch assembly are completely enclosed within a sealed housing, "jumping" of the wires thereof cannot be accomplished; and instead, only the possessor of a special key can activate the switch assembly which in turn permits the possessor of the ignition key of the automobile (and they should be one in the same person) to start the vehicle.

As a particularly advantageous feature of the instant invention, the novel switch assembly also carries manually operating actuating means which, when operated, permits the unlocking the hood of the vehicle. As will be shown, the movement of the actuating mechanism is depended upon the condition of the "make" and "break" contacts of the switch assembly and indeed cannot be actuated to open the hood unless the special key has been used to convert the switch assembly from its "break" to its "make" condition. Thus, the switch assembly of the instant invention performs two very important interrelated functions in that it renders the ignition system of the vehicle useless, unless a person has the special key which operates the switch assembly and simultaneously retains the hood of the automobile locked and thereby positively prevents anybody from attempting to "jump" the ignition wires.

Accordingly, it is an object of the instant invention to provide an antitheft ignition system for vehicles including automobiles, trucks, and the like.

Another object of the instant invention is to provide such an antitheft ignition system which includes a novel switch assembly as a major component thereof which switch assembly renders the ignition system useless unless the operator possesses a special operating key therefor.

Still another object of the instant invention is to provide such an antitheft ignition system wherein the major switch assembly thereof includes "make" and "break" contacts completely housed therein and which contacts are operable between their two conditions only in response to the insertion of a special key therefor.

Another object of the instant invention is to provide such an antitheft ignition system wherein the major switch assembly includes an actuating mechanism for unlocking the hood of the vehicle whereby access to the ignition system of the automobile is possible only if the switch assembly of the invention has been operated by the special operating key therefor.

These and other objects and many of the attendant advantages of this invention will be readily appreciated as the same becomes better understood by reference to the following detailed description when considered in connection with the accompanying drawings, wherein FIG. 1 shows the antitheft ignition system of the instant invention and illustrates in exploded perspective, the assembly which forms the major component thereof;

Figure 1:
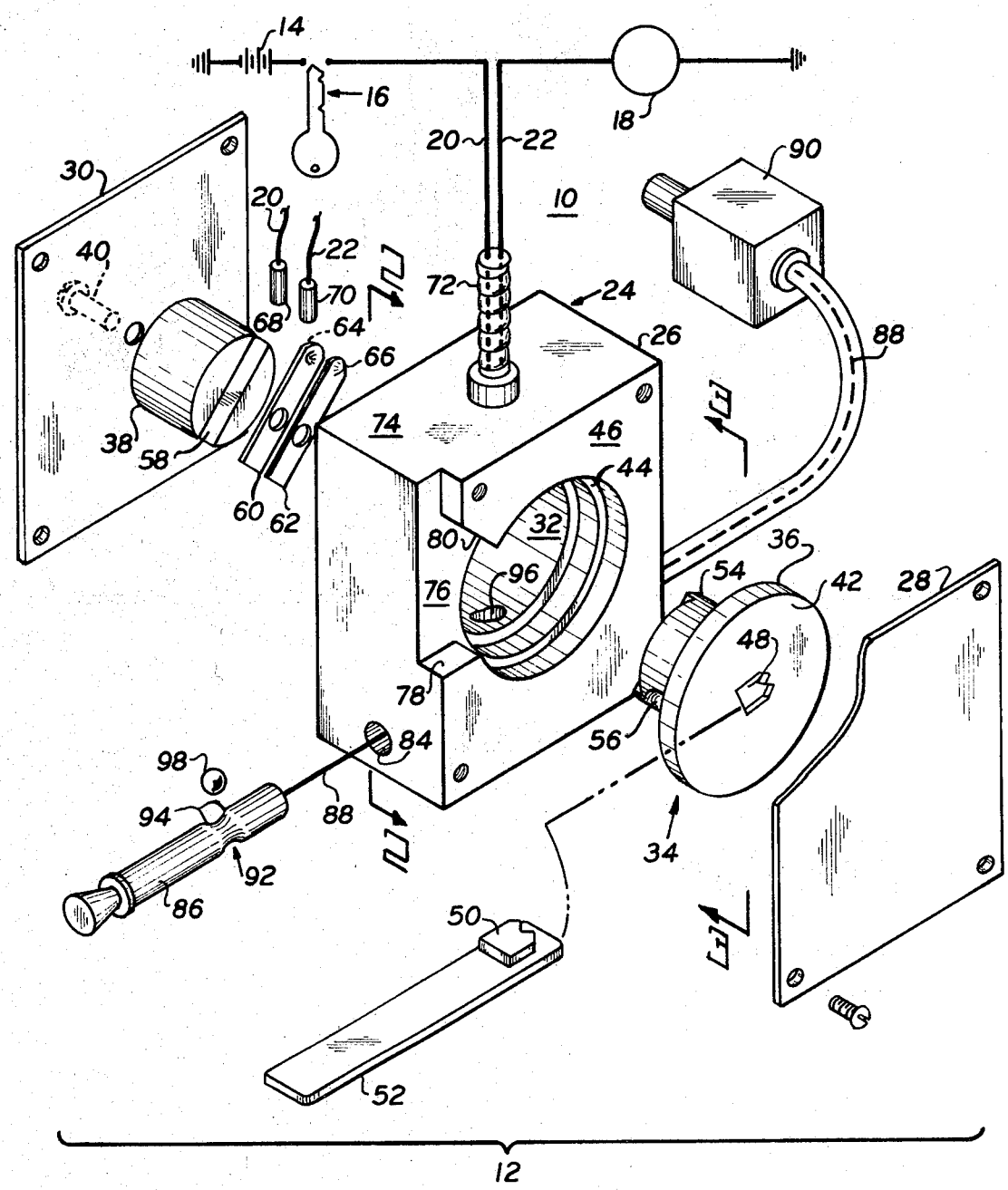

Referring now to the drawings, wherein like reference numerals designate like parts throughout the figures thereof, there is shown in FIG. 1 an antitheft ignition system 10 of the instant invention which includes a switch assembly 12 as the major component thereof. The switch assembly 12 is inserted in electrical series with a conventional ignition system which includes a source 14 such as a DC battery, a conventional ignition key operated switch schematically illustrated at 16 and an electric starter 18. As will be shown, a main function of the switch assembly 12 is to permit the electrical interconnection of wires 20 and 22 by authorized persons only, whereby operation of the ignition key switch 16 will permit the vehicle to be started. However, it is to be understood, that the switch assembly 12 has broader applications in that it can be used in any environment where it is desirable to provide a tamper-proof, key operated, on-off switch.

The switch assembly 12 includes a main housing 24 comprising a center portion 26, the sides of which are firmly secured by respective front and rear cover plates 28 and 30. Located centrally of the portion 26 is an opening 32 which carries a contact carrier 34 freely rotatable therein. The carrier 34 actually comprises, in the preferred embodiment, a forward section 36 and a rear section 38 which are joined by a screw 40 when the carrier 34 is assembled in its operative position within the opening 32. The forward section 36 includes a somewhat enlarged disc surface 42, the underside of which is rotatably seated in a recessed annulus 44 which surrounds the opening 32 on the front surface 46 of the center portion 26. The disc surface 42 also includes a recessed pattern 48 which as will be further described, may only be engaged by similarly shaped projecting pattern 50 provided on a specially designed operating key 52. The front section 36 also has a reduced diameter stem portion 54 which includes a ball receiving cavity 56, the purpose of which will be explained in greater detail.

The rear section 38 of the carrier 34 has approximately the same diameter as the stem section 54 of the forward section 36 and is of generally U-shaped in construction to define a recessed notch 58 within which a pair of conductive contact plates 60 and 62 are lodged when the carrier 34 is assembled within the center portion 26 of the housing 24. The plates 60 and 62 include outstanding projections 64 and 66 which provide an excellent wiping action with respect to a pair of terminals 68 and 70 secured on the ends of the wires 20 and 22 which pass from the opening 32 through the center portion 26 and into a shielded conduit 72 from an upper surface 74 of the center portion 26. It is to be understood that although a particular carrier arrangement 34 comprised of forward and rear sections 36 and 38 respectively has been described in detail, such construction is one of many which could be utilized to accurately locate conductor plates 60 and 62 within the opening 32 in proper relationship with respect to the terminals 68 and 70.

When the contact carrier 34 is assembled within the opening 32, the disc surface 42 of the forward section thereof, will lie flush with a planar surface 76 which together with upstanding stop surfaces 78 and 80 and the front cover 28 will define a keyway 82 (FIG. 2) into which the key 52 may be inserted to gain access to the contact carrier 34 whereby rotation thereof may be effected. Of course, it will be appreciated that only the possessor of a key having a projection pattern 50 which identically matches the recessed pattern 48 provided on the disc surface 42 of the contact carrier will be able to bring about its rotation.

Turning again to FIG. 2, and assuming that the entire switch assembly 12 of FIG. 1 has been assembled such that the elongated contact 60 and 62 lie in a plane which is intermediate the terminals 68 and 70, it is apparent that the wires 20 and 22 are not electrically connected such that even the operation of the ignition key switch 16 will not electrically connect the source 14 to the starter 18. However, if the operator possesses the key 52 having the matched pattern 50 projecting therefrom, he need only insert it into the keyway 82 such that the patterns 48 and 50 cooperatively engage and then rotate the key 52 until the key abuts the stop surface 80.

Figure 2:
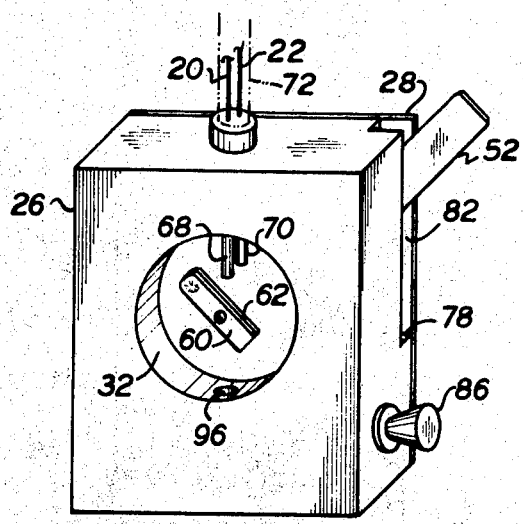
FIG. 2 is a view taken along the arrows 2—2 of FIG. 1 which illustrates the contact structure of the switch assembly of FIG. 1 and its open circuit or "break" condition.
Figure 2A:
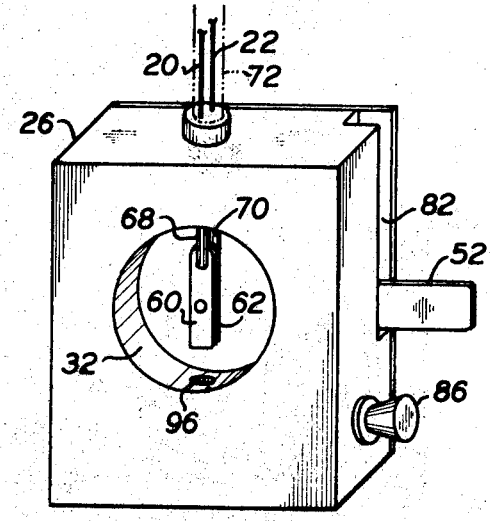
FIG. 2a is a view taken along the arrows 2—2 of FIG. 1 showing the contact structure of the switch assembly in its closed circuit or "make" condition.

This new key position is illustrated in FIG. 2a wherein it is also shown that during such rotation, and because of the rotation of the contact carrier 34, the conductive plates 60 and 62 have been rotated to an engaging position with respect to the terminals 68 and 70 such that the wires 20 and 22 are now electrically connected. The system is now enabled, such that operation of the ignition key switch 16 will start the vehicle. It should be pointed out that the keyway stop surfaces 78 and 80 are so positioned as to limit the rotational movement of the key 52 to a path of travel, the extremes of which will on the one hand provide sufficient electrical clearance between the contacts 60, 62 and the terminals 68 and 70 and on the other hand will accurately locate the contacts 60 and 62 in a perfect "make" position with respect to the terminals 68, 70 (FIGS. 2 and 2a). In FIGS. 2 and 2a the rear cover section 30 of the housing 24 is not shown in order to expose the interior of the center portion 26.

Returning to FIG. 1, it was previously disclosed that another function of the switch assembly 12 of the instant invention is to permit an independent but related operation, such as the unlocking of the hood of the vehicle, to be performed only if the key 52 had been previously utilized to convert the switch 12 from its electrical "break" condition of FIG. 2 to its electrical "make" position of FIG. 2a. To this end, the center portion 26 of the housing 24 include an elongated passageway 84 therethrough within which is slidably housed an actuating push-pull rod 86 the rear end of which is connected by means of a cable 88 to a mechanism 90 which in the described example, would function to unlock the hood of the vehicle when the rod 86 was pulled to the actuating position illustrated in FIG. 3a. It should be noted that unlocking mechanisms such as schematically illustrated at 90, are well known in the art and will not be described in any further detail in this specification. It is especially thought unnecessary in view of the fact that the movement of the rod 86 could be used to actuate any mechanism and not necessarily a hood release mechanism.

Figure 3:
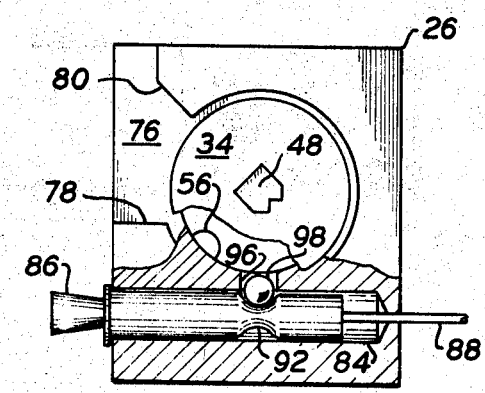
FIG. 3 is a view taken along the arrows 3—3 of FIG. 1 illustrating the manner in which the switch assembly thereof prevents the operation of manually operated actuating means provided thereon.
Figure 3A:
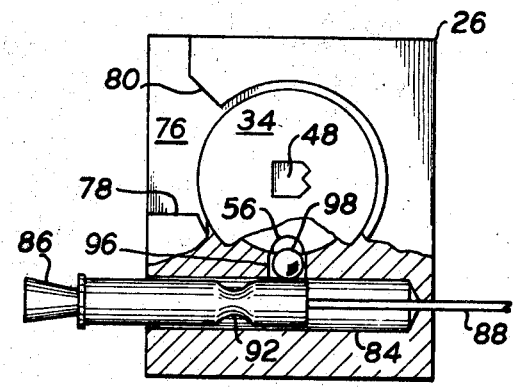
FIG. 3a is a view taken along the arrows 3—3 of FIG. 1 which illustrates the manner which the switch assembly thereof permits the operation of the manually operable actuating means thereon.

The rod 86 includes a reduced cross-sectional area portion 92 having contoured end portions 94 and as best seen in FIG. 3, the reduced cross-sectional area portion of the rod 92 is situated immediately beneath an internal passageway 96 when the rod is in the nonactuating position of FIG. 3. The passageway 96 joins the rod bearing passageway 84 with the contact carrier passageway 32 and functions to house a stop member 98 in the form of a small sphere.

With reference to FIG. 3, (which has the forward cover portions 28 of the housing removed to clarify the drawing) when the switch assembly is in the open circuit condition that is, the key 52 has not been utilized to switch the contacts from the arrangement of FIG. 2 to the arrangement of FIG. 2a, the receiving notch 56 of the contact carrier 34 is not aligned with the passageway 96 such that a significant portion of the stop member 98 is forced into the reduced cross-sectional area portion 92 of the rod 86. Hence, the rod 66 cannot be pulled from its nonactuating position of FIG. 3 to actuating position of FIG. 3a. However, once the key 52 is utilized to convert the contacts from the position of FIG. 2 to the position of FIG. 2a, the carrier 34 has rotated sufficiently to locate the receiving notch 56 into alignment with the internal passageway 96 whereby when the rod 86 is pulled, the smoothly contoured surfaces 94 thereof will cam the ball 98 up into the receiving notch 56 such that the rod 86 may be completely pulled out to actuate the mechanism 90.

Thus the switch assembly will perform a dual function in that the ignition system of the vehicle will not be enabled until the key 52 is utilized and simultaneously, the hood of the vehicle will be permanently locked to prevent unauthorized persons from attempting to "jump" the wires.

Figure 4:
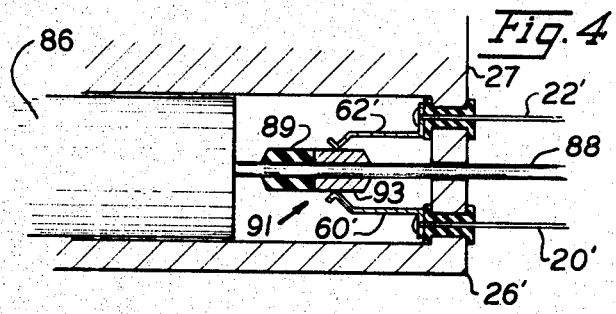
FIG. 4 shows another embodiment of the antitheft ignition system of the instant invention.

With reference to FIG. 4, there is shown another embodiment of the instant invention wherein the electrical contacts 60 and 62 have been replaced with contacts 60' and 62' which are fixed within the passageway 84 by means well known in the art to a rear wall 27 of center portion 26'. It should be noted that aside from the contacts 60' and 62', the center portion 26' is similar to center portion 26. A bushing generally designated by reference numeral 91 is mounted on cable 88 and is comprised of an insulative material portion 89 and a conductive material portion 93. The bushing 91 is adapted to fit snugly between the ends of contacts 60' and 62' and the leads 20' and 22' respectively connected thereto are coupled in the electrical ignition circuit in the same manner as the leads 20 and 22 of FIG. 1. Thus, in a closed or a locked position, the rod member 86 is in the position shown in FIG. 3 and the insulating portion 89 of bushing 91 is located between the leads 60', 62' such that the automobile ignition circuit is open-circuited. In operation, when the key 52 is placed in the matched pattern 48 and then the key and center portion 26' are rotated until the key abuts the stop surface 80 of center portion 26 as previously described, the receiving notch 56 is aligned with the internal passageway 96 (FIG. 3a) whereby the rod 86 may be pulled outwardly such that the conductive portion 93 couples the lead 62' to lead 60' thereby completing the ignition circuit as illustrated in FIG. 4, and simultaneously actuating the mechanism 90.

It should be noted that although the embodiment shown in FIG. 4 shows the contacts 60' and 62' and the bushing 91 enclosed in housing 26', it is obvious that these parts may be enclosed in a separate housing such that the contacts would be located within the engine compartment rather than the interior of the vehicle.

It should also be understood that the foregoing relates to only preferred embodiments of the invention, and that it is intended to cover all changes and modifications of the examples of the invention herein chosen for the purpose of the disclosure, which do not constitute departures from the spirit and scope of the invention.

I claim:

1. A switching apparatus comprising:
   a housing, having an opening therethrough and having stationary contacts with end portions which protrude into said opening and conductive portions which pass through said housing to the exterior thereof;
   a cylindrical shaped contact carrier mounted for rotational movement within said opening of said housing, said contact carrier having movable contact means secured thereto for rotational movement therewith, whereby rotation of said contact carrier from a first position to a second position thereby moves said movable contact means from a nonengaging to an engaging position with respect to said stationary contacts, respectively, said carrier further including a front and rear surface between which is defined a cavity which houses said movable contact means whereby said movable contact means is inaccessible from the front and rear surface of said housing;

said end portions of said stationary contacts being spaced apart slightly less than the thickness of said movable contact means and positioned on opposite sides of said movable contact means such that a wiping action is effected as said movable contact means is moved from said nonengaging to said engaging position;

a removable key means comprising a flat planar surface with a projecting planar pattern of a preselected shape; and said carrier includes a key means comprising a recess in said front surface thereof, said recess having a planar pattern corresponding to said preselected shape of said key means which is adapted to be received therein.

2. The switching apparatus as recited in claim 1 wherein said keyway is defined by a first and second stop surfaces which limit the rotational travel of said key means to an arcuate path of movement and thereby define at opposite ends thereof said first and second positions of said carrier.

3. The switching apparatus as recited in claim 1 wherein said housing includes an elongated passageway completely therethrough and a hole which communicates with both said opening and said elongated passageway;

said apparatus further comprises an actuating means partially carried in said passageway, said actuating means being movable from a nonactuated to an actuated position only if said carrier has been rotated from said first to said second position, said actuating means comprising an elongated rod having a gradually reduced cross-sectional area portion;

said carrier further including a stop member receiving notch which is aligned with said hole when said carrier is in said second position, and a stop member which is located in said hole and in said elongated passageway against said gradually reduced cross-sectional area portion of said elongated rod when said actuating means is in its nonactuating position and which stop member is moved in said hole against said stop member receiving notch of said carrier when said carrier is rotated to its second position and said elongated rod is moved to its actuated position.

4. A switching apparatus for coupling and uncoupling a pair of electrical contacts comprising:

a removable key;

a housing having a circular opening and an elongated passageway therein and a hole which communicates with said opening and said elongated passageway;

a cylindrical carrier rotatably carried within said opening of said housing and having a surface adapted to receive said key and a surface with a stop member receiving notch, said carrier adapted to be rotated from a first position to a second position when said key is inserted and rotated therewith;

an actuating means partially carried in said elongated passageway of said housing, said actuating means being movable from a nonactuating to an actuating position only if said carrier has been rotated from said first to said second position, said actuating means comprising an elongated rod having a gradually reduced cross-sectional area portion and having one end connected to a latching mechanism and;

a stop member;

which is located in said hole and in said elongated passageway against said gradually reduced cross-sectional area portion of said elongated rod when said actuating means is in its nonactuating position and which stop member is moved in said hole against said stop member receiving notch of said carrier when said carrier is rotated to its second position and said elongated rod is moved to its actuated position to couple together said electrical contacts.

5. The switching apparatus as recited in claim 4 wherein said rod further includes a bushing positioned mediate the ends of said rod, said bushing having a conductive portion and a nonconductive portion whereby said nonconductive portion is positioned between said contacts when said actuating means is in said nonactuating position and said conductive portion is positioned between said contacts when said actuating means is in said actuating position.